Dec. 18, 1923.
P. S. BAUER
STEERING GEAR
Filed May 4, 1922
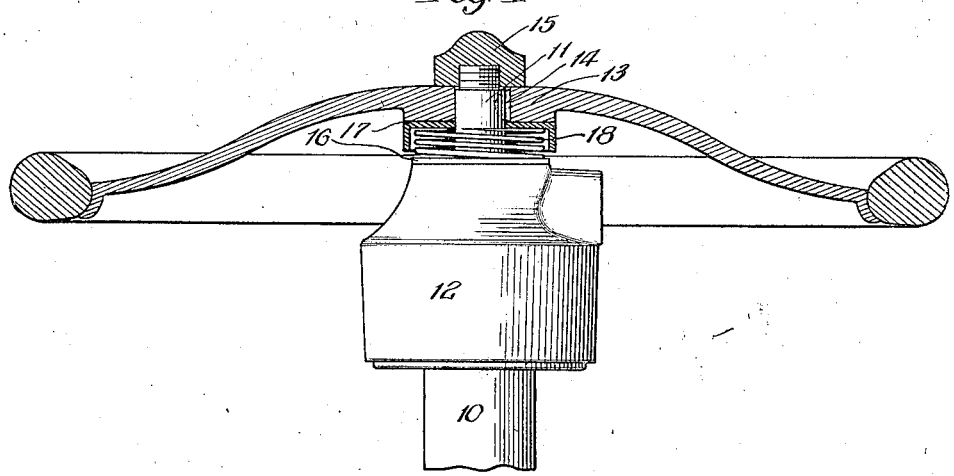
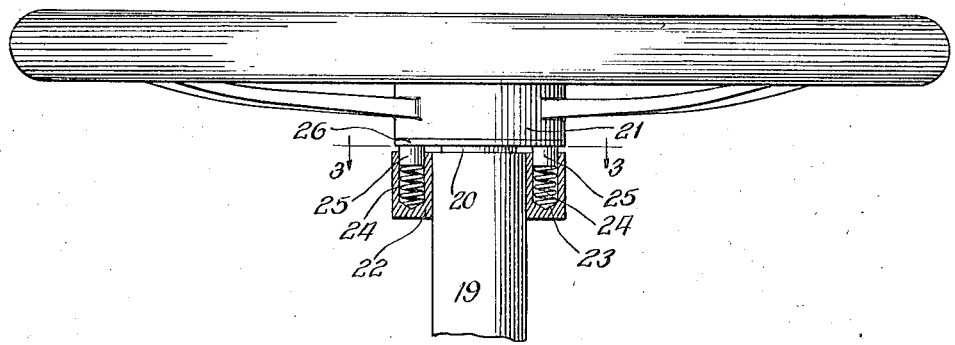
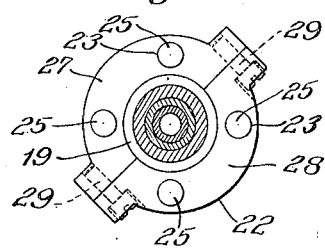
Inventor:
Perry S. Bauer
By: Wm. J. Belt
Atty.

Patented Dec. 18, 1923.

1,478,013

UNITED STATES PATENT OFFICE.

PERRY S. BAUER, OF CHICAGO, ILLINOIS.

STEERING GEAR.

Application filed May 4, 1922. Serial No. 558,411.

*To all whom it may concern:*

Be it known that I, PERRY S. BAUER, a citizen of the United States, residing at Chicago, in the county of Cook and State of Illinois, have invented certain new and useful Improvements in Steering Gears, of which the following is a specification.

In motor driven vehicles, as usually constructed, the dirigible wheels are arranged to swing about substantially vertical axes under the control of a steering wheel accessible to the driver's seat. The location of these axes and other unavoidable incidents to commercial manufacture cause unevennesses of the road surface in almost every form to react against the dirigible wheels with the tendency to change their direction, which is reflected in the steering wheel in the form of vibratory oscillations that are responsible for a great deal of the fatigue experienced in driving.

The principal object of the invention is to overcome this condition by absorbing the impulses from the dirigible wheels before they reach the steering wheel.

A further object of the invention is to provide the steering gear with sufficient frictional resistance to prevent ordinary obstructions in the roadway from producing any movement of the steering wheel.

A further object of the invention is to provide a yielding support for the steering wheel that will absorb vibrations lengthwise to the steering shaft.

Further objects will become apparent as the description is read in connection with the accompanying drawing illustrating selected embodiments of the invention in which—

Fig. 1 is a section of part of the steering gear embodying my invention;

Fig. 2 is a similar view illustrating a modification;

Fig. 3 is a transverse section on the line 3—3 of Fig. 2.

Referring to the drawing, Fig. 1, 10 indicates a steering column within which a steering shaft 11 is rotatably mounted. The particular form of steering gear selected for this embodiment includes planetary gearing which is located within the casing 12. The steering shaft 11 is equipped at its upper end with a steering wheel 13 secured thereto by a key 14 and a nut 15. The upper end of the casing 12, or the cap therefor, is provided with a flat friction surface 16 which may be integral with the cap or formed by a special disk or the like secured thereto. In like manner, the lower side of the wheel hub is equipped with a cup-like washer 17. Between the disk 16 and the washer 17 is a compression spring 18 here shown in the form of a helix and of sufficient strength to provide a considerable degree of friction to resist the turning of the steering wheel. The arrangement of the spring and the friction surfaces on the wheel and the steering column may be varied quite widely, so long as there is ample surface and friction created by spring pressure in sufficient amount to overcome the tendency of the dirigible wheels to rock the steering wheel. The disk 16 and the washer 17 may be fixed to the spring 18 and operate against corresponding surfaces on the wheel and the cap of the steering column and suitable means may be provided for adjusting the spring pressure to take care of wear or other conditions.

In Fig. 2 I have illustrated a modification suited for automobiles in which the steering shaft is in one piece and the steering wheel is secured directly to the upper end. In this modification 19 indicates the steering column in which the steering shaft 20 is rotatably mounted. The steering wheel 21 is suitably secured to the upper end of the steering shaft and serves as a means for rotating the shaft to direct the course of the vehicle.

I secure to the steering column 19 beneath the hub of the steering wheel, a collar 22 having a plurality of recesses 23 in which are compression springs 24 that act upon friction elements 25 forcing them into contact with the underside of the hub of the steering wheel. These friction devices may be in any suitable number or in any size preferred and may be made of a variety of materials that will produce the necessary friction in contact with the hub of the steering wheel or a plate connected thereto, such as indicated at 26. The collar 22 may be conveniently made in two pieces 27 and 28 as indicated in Fig. 3 so that the attachment can be easily applied to existing vehicles as well as assembled in new vehicles. The screws 29 securing the two halves together will permit road adjustment for varying the pressure of the springs and consequently the friction produced.

Either of the above forms, and a variety of others that need not be illustrated, will produce sufficient friction between the steering shaft and the steering column or other fixed part of the vehicle to prevent impulses derived from the dirigible wheel striking obstructions or uneven places in the road from turning the steering wheel or giving it rotary vibrations. The invention will also serve to absorb vibrations lengthwise to the steering shaft. As the result a driver can operate a vehicle over varying roadways for a long time without experiencing the usual fatigue incident to constantly struggling with more or less vigor to keep the vehicle directed in the desired course. When the road is straight and comparatively even it is possible for the driver to release the wheel entirely and depend upon the friction devices for maintaining the course of the vehicle.

I am aware that heretofore steering wheels have been equipped with positively engaging clutch devices for automatically locking the steering gear against movement when the driver releases the wheel. These devices have always been difficult to operate because it was necessary for the driver to positively release his clutch teeth or other engaging elements in order to free the wheel which cannot be conveniently done with the speed and ease necessary to comfortable driving. My invention is distinguished from these in that it not only holds the steering gear in an adjusted position and directs the course of the vehicle without the aid of the driver, but it will permit as ready operation of the steering gear as can be had when no such devices are present. Furthermore my invention will absorb vibrations of every character whether rotary or lengthwise to the steering shaft and relieve the driver of the fatigue caused by the constant motion of the steering wheel.

While I have shown the invention applied to the steering shaft at the upper end it will be obvious that it may be located in a variety of places without materially changing the results.

I am aware that changes may be made in the form, construction and arrangement of the invention, as set forth in the selected embodiments herein, without departing from the scope or sacrificing any of its material advantages, and I therefore reserve the right to make all such changes as fairly fall within the scope of the following claims.

I claim:

1. The combination of a steering column, a steering shaft rotatably mounted therein and projecting beyond the upper end thereof, a steering wheel secured to the projecting end of said steering shaft, a friction surface on the lower side of said steering wheel, and resilient friction means carried by said steering column and engaging said steering wheel.

2. The combination of a steering column, a steering shaft journaled therein and projecting above the end of the steering column, a steering wheel secured to said steering shaft, a collar on said steering column and spring mounted friction devices seated in said collar and engaging said steering wheel.

3. The combination of a steering column, a steering shaft rotatably mounted therein and projecting above the end thereof, a steering wheel secured to said steering shaft, a collar on said steering column having a plurality of longitudinal recesses therein, friction devices located in said recesses and engaging said steering wheel, and compression springs in said recesses acting upon said friction devices.

4. The combination of a steering column, a steering shaft rotatably mounted in said column, a steering wheel secured to said steering shaft, a split collar secured to said steering column having a plurality of recesses therein opening at the upper side, and spring pressed friction devices located in said recesses and acting upon said steering wheel.

PERRY S. BAUER.